W. S. SIMPSON.
ARMOR PLATE.
APPLICATION FILED JAN. 17, 1908.
967,146.
Patented Aug. 9, 1910.
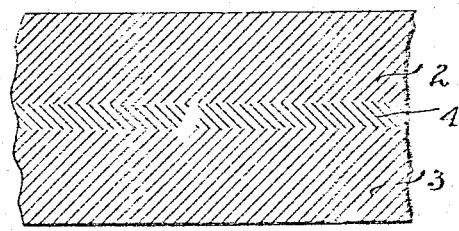
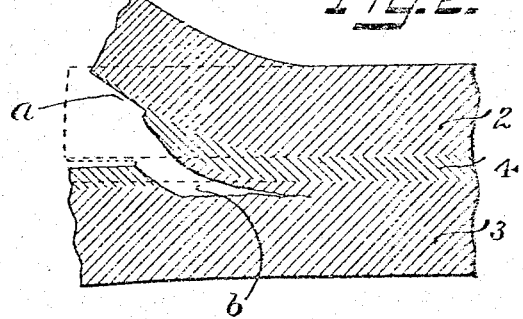
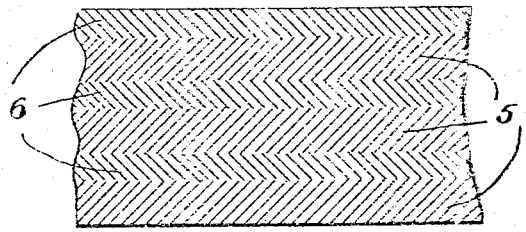
Witnesses:
Inventor:
William S. Simpson,
By his Attorney,

UNITED STATES PATENT OFFICE.

WILLIAM SPEIRS SIMPSON, OF LONDON, ENGLAND, ASSIGNOR TO UNITED STATES CARBO-WELDING COMPANY OF DELAWARE.

ARMOR-PLATE.

967,146.  Specification of Letters Patent.  Patented Aug. 9, 1910.

Original application filed April 12, 1907, Serial No. 367,840. Divided and this application filed January 17, 1908. Serial No. 411,220.

*To all whom it may concern:*

Be it known that I, WILLIAM SPEIRS SIMPSON, a subject of the King of Great Britain, residing in London, England, have invented certain new and useful Improvements in Armor-Plates, of which the following is a specification.

This application is a division of application 367840, filed April 12, 1907, patented July 6, 1909, numbered 927292 and the improvement relates to composite structures of various kinds made up of unlike metals, such as soft and hard metals, that is, metals of different kinds or characteristics, or which fuse at different temperatures, and especially such for instance as iron or steel and copper, welded together without the use of a flux as ordinarily understood and without pressure. While shown in connection with the production of armor plates or similar protecting surfaces, such for instance as ship plates, where it is desirable to provide an iron or steel plate protected from rust or other corrosive substances, by coating it with copper or a similar non-rusting surface, I do not limit myself in this particular.

By means of the present improvement composite structures may be provided in which a harder metal, such as steel, may be protected from corrosion or deterioration, or in which one metal may be strengthened by another by the provision of a strong homogeneous composite whole.

The present improvement contemplates the manufacture of various articles, but particularly armor plates, by building them up of layers of steel or iron combined with intermediate layers of a metal relatively more ductile or mobile, or both, such layers or component parts being welded together so that the strength of each member is joined to the strength of the other, thereby to provide an integral structure and cause such welded metals to have the characteristics and qualities which might pertain to a corresponding structure made integral of one metal, but consisting of some metal having a lesser stability or strength than the steel components and a greater stability or strength, or both, than the intermediate ductile component.

The present improvement consists of compound or composite metal bodies consisting of layers or strata of unlike metals united as permanently, for example, as welded layers of iron or steel, and since this perfect union of iron or steel is usually designated as and generally understood to be a weld, and because this term "weld" is the one which by those skilled in the art is most naturally applied to such a union, I have also designated herein the union which is obtained between the unlike metals by the term "weld," although it is to be understood that I do not thereby limit or confine myself to any particular theory as to the actual nature of the union of such unlike metals, although I apprehend that since tests have demonstrated the impossibility of wedging the copper from the steel, the steel itself separating one part from another rather than the copper separating therefrom, there is a molecular interpenetration of the metals and what may be considered a perfect or true weld between such unlike metals, as distinguished from the mere adhesion, as by soldering or sticking together, of metals in sheet or plate form so as to make up laminated or other structures or machine elements, which latter structures lack the mechanical qualities and efficiency which would naturally belong to a strictly integral member.

By means of the procedure set forth in this case, it has been found practicable, it is believed for the first time in the history of these arts, to construct a composite or laminated or built up member or structure, such for instance as an armor plate, although the invention is not limited to that particular form of plate or that particular character of article, in such a reliable manner that it becomes superior in mechanical qualities and efficiency to a non-built up member having in the aggregate the corresponding amount of rigidity and mobility.

As a preface to a further description of the present improvement, it may be said that it is generally admitted by those familiar with matters of this kind that the welding of copper and steel, or other unlike metals has not up to the present invention been considered possible, although I am aware that it has been sometimes alleged that such results have been obtained. But experience has proven that such so-called welding was but mere adhesion of one unlike metal to another, and not a welding or a molecular interpenetration of one with the other, and consequently one metal could be stripped from the other by means of a cold chisel or wedge, although for some purposes such copper and steel for instance might adhere sufficiently together to permit them to be used so long as there was no sufficient stripping or other separating force used to strip or separate one metal from the other. It is, however, also admitted by those familiar with this art that the various structures which have been made by me, composed of unlike metals, such for instance as copper and steel, are thoroughly and effectively welded together, and so thoroughly and so effectively welded that a laminated armor plate, of which Figure 2 is but an illustration, made up of two steel plates united and welded one with the other by an intermediate layer of copper could not be separated or stripped from such copper, notwithstanding the structure was sawed from its edge inward, as at $a$, and a wedge then used with a view of separating the copper from the steel, which, however, did not separate, although one of the steel plates itself separated, as at $b$, one part from another, the said Fig. 2 being as nearly a true representation of one such attempt as is possible to put in a drawing for a patent. And although many similar tests have been made each has, however, thoroughly demonstrated the correctness of the statements and claims herein made.

The improvement enables the provision of an armor plate made up of a hard or self-hardening outer plate or plates of superior tool steel and a more mobile or softer steel inner plate or backing which will act as a cushion and as a medium for holding together the harder outer plate or plates should the same be fractured by a projectile. It also enables such a structure to be made up with a rustless outer surface if desired, of copper or brass for instance, or to be made up with the mobile metal or cushion of copper or brass on the inner surface, or to be made up in innumerable other ways which would afford to a vessel the highest possible efficiency in the way of armor protection, it being well known that high efficiency in the way of armor protection is obtained when it is practicable to join with one or more hard outer layers or surfaces or plates one or more layers of metal of a softer or more mobile character which will act as a cushioning means, since this not only acts should the hard outer plates become fractured as a uniting means to hold them against separation, but also enables them to more effectively resist a projectile, since it permits such plates to yield under the impact of such a projectile.

One of the advantages of the present improvement is that the cushioning or uniting material for holding the hard outer plates of steel together may consist entirely of copper, or the copper may comprise the material which unites such hard outer plates to inner or softer plates of steel or iron or other material, as may be found most desirable, the whole welded together in one compound or composite integral structure in which the layers of unlike metal, as for instance copper and steel, will have a molecular interpenetration not present in plates which merely adhere together. It will therefore be seen that the possibilities of use for the present improvement are innumerable, and that such improvement provides a structure or armor plate far superior to any laminated plate the members of which are riveted, and superior to any solid plate of one uniform metal, or to any form of plate which does not have the characteristics of the present improvement.

As exemplifying one of the embodiments in which the present improvement may be incorporated, and as an illustration of one form of such embodiment, the drawings illustrate a composite or compound structure made up of layers of unlike metals, such for instance as an armor plate.

In the drawings Fig. 1 is intended to illustrate a pair of steel layers or plates 2 and 3 welded to and by an intermediate layer of copper 4, and one of which layers, as for instance the inner or upper layer 2, may be of softer or more mobile character than the outer layer 3, which may be self-hardening tool-steel. Fig. 2 illustrates, as hereinbefore stated, this composite armor plate after an unsuccessful attempt to separate or strip the copper from the steel by wedging, the same having been first sawed from its edge inwardly. And Fig. 3 illustrates another form of the many which the present embodiment may take, and is intended to illustrate three layers of one metal welded to and by three layers of an unlike metal, the first three layers 5 being intended to illustrate steel, either of the same or different characteristics, and the second three layers 6 copper, the figure illustrating one outer surface of the structure covered with copper and the other as of steel.

In the present embodiment the copper plate is shown of less thickness than the steel, although this may be otherwise, and in some forms of this improved composite structure the copper may be used merely as a surface coating either for ornamentation or protection.

The welding may be carried out in various ways, according to the character and formation of the structure or plate. In some embodiments the several plates of unlike metals may be placed surface to surface and then submitted to the welding treatment; or the plates of steel or other metal plates may be placed in proper position with a suitable intervening space between and the unlike metal poured therebetween in a molten condition; or, if the article is of curved form and it is desired so to do, it may be produced by winding the copper and the steel sheets together and then submitting them to the welding operation hereinafter described, the foregoing being but illustrative of the ways that might be adopted and have been utilized by me in the successful welding of articles of various kinds. It is therefore to be understood that within the scope of the present improvement is the manufacture of various composite articles of different forms made up of united or welded unlike metals, or of hard and soft metals, such as metals which fuse or melt at different temperatures, such as aluminium, copper, tin, lead, zinc, and their various alloys, which comprise in part the softer metals, and melt at low temperatures, and steel or iron, which melt at high temperatures and comprise in part the harder metals. In the manufacture of these composite structures or armor plates, I bring into contact in any suitable way, the surfaces of the requisite pieces of unlike, such as hard and soft, metals which are to be united, joined or welded together. For instance a sheet or plate of steel or iron of the desired thickness is brought into contact with a corresponding sheet or plate of aluminum, copper, brass, or other metal of any required thickness with which it is intended to back up or cover the former upon one or both sides, and the same are clamped together in the desired position; or in some cases, as for instance to form the plates shown in Figs. 1 and 3 of the drawing, with a sheet or plate of copper, aluminium, brass or other metal interposed therebetween, the plates are assembled in the desired relative positions and firmly clamped or otherwise held together. The structure so made up is then incased, covered or enveloped on all sides, and inside and out if hollow or tubular, with a composition or paste made up of a carbonaceous material, such for instance as ground coke, charcoal or other form of carbon as pure as possible and mixed with water and a suitable binding material, such as treacle, sugar, starch, flour or other similar substance, preferably such as may be soluble in water and having the properties of binding with water and, when calcined, of forming a reasonably pure, coherent coke. This carbonaceous covering or envelop may either be formed into a mold to fit the mass of metal assembled for welding, and which after being suitably dried may be used to envelop the structure while being heated; or the metals to be welded may be placed in a suitable receptacle, such as a fire resisting crucible or a metallic vessel with or without a cover, and the carbonaceous paste may be tightly packed around the same on all sides, after which the entire mass of metals, carbonaceous covering or packing and receptacle are subjected to sufficient heat, either in a muffle or other furnace, or in a bath of molten metal, such as pig iron, to fuse or melt the softer but not the harder metal. Under the said conditions, and when subjected to a temperature sufficient to melt the softer metal, the carbonaceous casing or envelop prepared as aforesaid provides a reducing agent or atmosphere which effectively deoxidizes the surface of the harder metal, which requires no other preparatory pickling or cleaning, and also prevents the oxidation of the softer metal while molten, so that in a brief space of time after fusing the latter becomes firmly joined, united or welded to and with the harder metal at every point of contact, in all cases there being an appreciable infiltration of a portion of the softer metal into the harder metal in contact therewith. The carbonaceous paste prepared as aforesaid also forms an efficient mold to retain in the desired position and prevent the escape of the softer metal while in a molten condition.

In some cases, especially when the softer metal used is copper, it is desirable to add to the carbonaceous paste a small quantity of zinc or zinc filings, the presence of which is advantageous for the prevention of blow holes in the copper surface while cooling.

In some cases the two or more steel plates or like members which are to be joined by an interposed sheet of softer or welding metal, such as copper or brass, may be spaced or kept at the desired distance from each other by inserting between the same suitable spacing disks or rivets of steel to prevent the softer or welding metal from being squeezed out or displaced while in a molten condition by the weight or pressure of the plates to be joined, united or welded.

In some cases when it is desired to join, unite or weld together two or more plates to form a composite structure of iron or steel, the members may be assembled or arranged and suitably spaced and clamped or otherwise held in their desired relative positions and a quantity of the softer metal or welding material, sufficient to accomplish the desired union or welding, may be placed either in solid or granular form on the top or edge of the assembled articles of harder metal, and the entire mass then covered or enveloped in the carbonaceous paste hereinbefore described and subjected to heat in such a manner that the softer metal when fused or melted will flow down and fill the space between or interstices of the mass of harder metals underneath and so accomplish the desired union or welding together of such parts. Or in some cases the harder metals may be clamped in the desired relative positions and the layers covered or enveloped with the hereinbefore described carbonaceous paste, and while being subjected to the necessary heat the copper, brass, or other softer metal with which it is desired to weld together the plates or articles of harder metal may be introduced in a molten condition and brought into contact therewith in any competent manner so as to flow down and fill up the joints or interstices or prearranged spaces intended to receive the same between the plates or members of hard metal. A simple method of such introduction is when enveloping or covering the mass with the covering of carbonaceous paste to so place a plumbago crucible having a cover on the top of the mass of assembled metals that from a small hole or orifice in the bottom of such crucible, which must be stoppered until the moment when the soft metal or welding material is to be released therefrom, the molten metal when poured therein may flow into these joints or interstices between the harder metal plates or other articles and join, unite or weld the same firmly together, or in some cases may form a coating of the softer metal upon the harder metal in a suitably prepared mold of the carbonaceous paste hereinbefore described.

In some cases a paste or enveloping material may be employed that is lacking the requisite carbon, or is of refractory character, such as graphite, in which event the metals to be welded or united may be placed in a crucible or other suitable receptacle having a cover, which may be luted or otherwise fastened thereon, and the enveloping material placed around such metals therein and the receptacle hermetically sealed and while being subjected to heat carbonic oxid may be introduced into the crucible under more or less pressure by means of a tube passing through the cover thereof and through the enveloping material, so that the gas may be brought into contact with the metals under the conditions required to provide a reducing or deoxidizing atmosphere suitable for the accomplishment of the desired result. In like manner, the members or plates of the harder metal making up the armor plate may be enveloped or covered with a paste the chief ingredient whereof may be graphite or other material so refractory or low in carbon as to require the additional presence of carbonic oxid introduced as above mentioned and the copper, brass or other softer metal or welding material may be introduced in molten form and brought into contact with the harder metals in the manner hereinbefore described. And thus, in a number of different ways this improved structure of welded unlike metals may be formed by subjecting the plates or members forming the structure to a material effective to cause, as I apprehend, the molecular interpenetration of one metal with the other while one is being brought to or is in a molten condition.

What I claim as my invention is:

1. As a new article of manufacture armor plate consisting of a composite structure composed of a harder and softer metal united by interpenetration of the opposing parts of said metals, substantially as described.

2. As a new article of manufacture armor plate consisting of a composite structure comprising a series of two or more steel or iron plates of varying qualities of metal as regards carbon contents or capability of being hardened or tempered, the same being permanently united by a molecular interpenetration caused by interposed softer metal and in the manner hereinbefore described.

WILLIAM SPEIRS SIMPSON.

Witnesses:
H. D. JAMESON,
F. L. RAND.